(12) United States Patent
Shinagawa

(10) Patent No.: US 8,910,756 B2
(45) Date of Patent: Dec. 16, 2014

(54) BRAKE DISC

(75) Inventor: Yoshinori Shinagawa, Takatsuki (JP)

(73) Assignee: Sunstar Engineering Inc., Takatsuki-shi (JP)

( * ) Notice: Subject to any disclaimer, the term of this patent is extended or adjusted under 35 U.S.C. 154(b) by 62 days.

(21) Appl. No.: 13/703,144

(22) PCT Filed: Jun. 7, 2011

(86) PCT No.: PCT/JP2011/063014
§ 371 (c)(1),
(2), (4) Date: Jan. 16, 2013

(87) PCT Pub. No.: WO2011/155478
PCT Pub. Date: Dec. 15, 2011

(65) Prior Publication Data
US 2013/0112515 A1 May 9, 2013

(30) Foreign Application Priority Data

Jun. 11, 2010 (JP) ................................ 2010-133604

(51) Int. Cl.
*F16D 65/12* (2006.01)
*F16D 65/02* (2006.01)
*F16D 69/00* (2006.01)

(52) U.S. Cl.
CPC ........ *F16D 65/12* (2013.01); *F16D 2065/1392* (2013.01); *F16D 2065/1396* (2013.01); *F16D 2069/004* (2013.01); *F16D 2065/1368* (2013.01); *F16D 2065/1316* (2013.01)
USPC ................................ 188/218 XL; 188/264 A

(58) Field of Classification Search
USPC ............... 188/205 A, 206 A, 218 XL, 264 A, 188/264 AA
See application file for complete search history.

(56) References Cited

U.S. PATENT DOCUMENTS

| | | | | |
|---|---|---|---|---|
| 7,284,643 | B1 * | 10/2007 | Kao | 188/218 XL |
| 2004/0011608 | A1 * | 1/2004 | Tironi et al. | 188/218 XL |
| 2004/0200678 | A1 * | 10/2004 | Lin | 188/218 XL |
| 2008/0296108 | A1 | 12/2008 | Mozzati | |

(Continued)

FOREIGN PATENT DOCUMENTS

JP S63-49031 4/1988
JP S63-196843 12/1988
(Continued)

OTHER PUBLICATIONS

International Search Report for International Application No. PCT/JP2011/063014 dated Jul. 5, 2011.

*Primary Examiner* — Christopher Schwartz
(74) *Attorney, Agent, or Firm* — Kratz, Quintos & Hanson, LLP

(57) ABSTRACT

Provided is a brake disc capable of suppressing wear of a brake pad, improving braking performance, and preventing occurrence of heat shrinkage between weight reduction holes. In a brake disc 1 for a two-wheeled motor vehicle, the brake disc 1 including a plurality of weight reduction holes 12 for weight reduction formed in a slide section 11 making sliding contact with a brake pad 2, a plurality of grooves 13 is formed at predetermined intervals in a circumferential direction so as to pass through a plurality of adjacent ones of the weight reduction holes 12, the grooves being formed on at least one of slide surfaces 11*a* of the slide section 11. Each of the grooves 13 is formed into a linear or curved shape from an inner circumference through an outer circumference of the slide section 11. The grooves 13 are formed to be inclined so that one end portion of each of the grooves 13 at the inner circumferential side is positioned forward of the other end portion thereof at the outer circumferential side in a rotation direction of the brake disc 1. At least the end portion of each of the grooves 13 at the outer circumferential side opens.

7 Claims, 8 Drawing Sheets

(56) References Cited

U.S. PATENT DOCUMENTS

| | | | |
|---|---|---|---|
| 2009/0266653 A1* | 10/2009 | Antanaitis et al. | 188/72.1 |
| 2010/0044171 A1* | 2/2010 | Hoshi et al. | 188/218 XL |
| 2011/0079474 A1* | 4/2011 | Fujita et al. | 188/218 XL |

FOREIGN PATENT DOCUMENTS

| | | |
|---|---|---|
| JP | H5-73329 | 10/1993 |
| JP | H6-28374 | 4/1994 |
| JP | 2002-295549 A1 | 10/2002 |
| JP | 2003-74604 A1 | 3/2003 |
| JP | 2003-301874 A1 | 10/2003 |
| JP | 2005-308051 A1 | 11/2005 |
| JP | 2009-526186 A1 | 7/2009 |
| JP | 2010-14190 A1 | 1/2010 |

* cited by examiner

BRAKE DISC

TECHNICAL FIELD

The present invention relates to a brake disc that can be preferably used as a brake disc for a two-wheeled motor vehicle.

BACKGROUND ART

Generally, as a brake disc for a two-wheeled motor vehicle, there have been widely put to practical use a brake disc that is provided with a mounting section to be mounted to a wheel and a slide section making sliding contact with a brake pad and is formed by press molding a single piece of metal plate, and a so-called floating brake disc that is provided with an annular slide disc having a slide section against which a brake pad is pressed, a hub disc which is attached to the inside of the slide disc, and a plurality of connectors which connects the brake disc and the hub disc to each other in a floating state.

Further, there has also been widely adopted a brake disc including a plurality of weight reduction holes which is formed in a slide section in a predetermined arrangement for the purpose of total weight reduction, improvement of the heat release property in the slide section, cleaning of a brake pad, and the like (see Patent Documents 1 and 2, for example).

Further, there has also been proposed and put to practical use a brake disc including one or more grooves which are formed in a slide section making sliding contact with a brake pad in order to prevent generation of noise during braking (see Patent Documents 3 to 5, for example).

CITATION LIST

Patent Literature

Patent Document 1: JP-A No. 2003-301874
Patent Document 2: JP-A No. 2003-74604
Patent Document 3: JP-A No. 2002-295549
Patent Document 4: JP-UM-A No. S63-196843
Patent Document 5: JP-UM-A No. S63-49031

SUMMARY OF INVENTION

Technical Problem

Forming weight reduction holes as in the inventions described in Patent Documents 1 and 2 makes it possible to reduce the weight of a brake disc, improve the heat release property in a slide section. In addition, since a surface of a brake pad can be cleaned by opening rims of the weight reduction holes, it is possible to prevent foreign objects from adhering to a slide surface which makes sliding contact with the brake pad, thereby preventing deterioration of the braking performance. However, in a region between adjacent weight reduction holes that are closely arranged, the heat capacity is smaller than that in the other regions. Therefore, there is a problem such that temperature fluctuation in such a between-holes region is larger than that in the other regions, and the between-holes region is therefore cooled down prior to other regions and thereby shrinks when the temperature is decreased, namely, so-called thermal shrinkage occurs, which causes breakage of the between-holes region. In particular, in a brake disc that is mounted on a racing two-wheeled motor vehicle, since a slide section is configured to have a narrow width in response to a demand for weight reduction, a distance between weight reduction holes tends to be shorter. Therefore, occurrence of the thermal shrinkage problem is one of important issues.

It is an object of the present invention to provide a brake disc that is capable of suppressing wear of a brake pad, improving braking performance, and preventing occurrence of thermal shrinkage between weight reduction holes.

Solution to Problem

A brake disc according to the present invention is a brake disc for a two-wheeled motor vehicle, the brake disc including a plurality of weight reduction holes for weight reduction, the weight reduction holes being formed in a slide section making sliding contact with a brake pad, wherein a plurality of grooves is formed at predetermined intervals in a circumferential direction so as to pass through a plurality of adjacent ones of the weight reduction holes, the grooves being formed on at least one of slide surfaces of the slide section.

Since the plurality of weight reduction holes is formed in the slide section in this brake disc, it is possible to reduce the weight of the brake disc and improve the heat release property in the slide section. In addition, since a surface of the brake pad can be cleaned by opening rims of the weight reduction holes, it is possible to prevent deterioration of the braking performance caused by foreign objects adhering to a slide surface which makes sliding contact with the brake pad. Further, since the grooves are formed across the slide section, it is possible to reduce the weight of the brake disc, improve the heat release property in the slide section, and improve the cleaning effect on the surface of the brake pad also by the grooves. In addition, although, in a region between adjacent weight reduction holes that are closely arranged, the heat capacity is smaller than that in the other regions, and temperature fluctuation in such a between-holes region therefore becomes larger than that in the other regions, frictional heat which is generated by direct contact between the between-holes region and the brake pad is not generated in the present invention by virtue of the grooves formed in the between-holes region. Therefore, it is possible to suppress generation of a heat spot in the between-holes region to thereby prevent thermal shrinkage in the between-holes region. As a result, a problem of breakage of the between-holes region due to the thermal shrinkage can be effectively prevented.

It is a preferred embodiment that, among regions each between adjacent ones of the weight reduction holes, the grooves are formed so as to pass through a region in which thermal shrinkage is likely to occur and weight reduction holes arranged on both sides of the region. Such a configuration makes it possible to reduce the total area of the grooves as much as possible while preventing generation of thermal shrinkage, thereby suppressing deterioration of the braking performance caused by reduction of the contact area between the brake pad and the brake disc as much as possible.

Each of the grooves may be formed into a linear shape or a curved shape from an inner circumference through an outer circumference of the slide section, or the grooves may also be formed in the radial direction of the slide section or formed to be inclined at an angle in a single direction with respect to a radial direction of the slide section depending on the arrangement of the weight reduction holes.

Further, it is a preferred embodiment that the grooves are formed to be inclined so that one end portion of each of the grooves at an inner circumferential side of the slide section is positioned forward of the other end portion thereof at an outer circumferential side of the slide section in a rotation direction of the brake disc. Although the grooves can also be formed to be inclined so that one end portion of each of the grooves at the inner circumferential side of the slide section is positioned rearward of the other end portion thereof at the outer circumferential side of the slide section in the rotation direction of the brake disc, forming the grooves as in the present invention is preferred since foreign objects which have entered the grooves are guided toward an outer circumference of the brake disc by contact with the brake pad, thereby making it possible to effectively discharge the foreign objects to the outside.

Further, it is also a preferred embodiment that at least the end portion of each of the grooves at an outer circumferential side of the slide section opens. Such a configuration makes it possible to efficiently discharge the foreign objects remaining in the grooves to the outside through the end portion of each of the grooves at the outer circumferential side by centrifugal force of the brake disc.

Further, it is also a preferred embodiment that each of the grooves is formed into a quadrangular groove. With such a configuration, even if the slide section becomes worn, the widths of the openings of the grooves remain unchanged. Therefore, it becomes possible to prevent a subtle change in the operational feeling of a brake, the subtle change being caused by wear of the slide section, to thereby obtain a stable operational feeling. Therefore, such a configuration is preferred.

Further, it is also a preferred embodiment that the width of each of the grooves is set to a size equal to or larger than the diameters of the weight reduction holes so that the grooves contain the weight reduction holes therein. The width of each of the grooves can also be set to a size that is smaller than the diameters of the weight reduction holes. However, in such a configuration, there is a problem such that corners facing the weight reduction holes are formed in intersecting portions between the grooves and the weight reduction hole, and these corners are easily to be broken. Therefore, the configuration as in the present invention is preferred because the durability of the brake disc can be improved by eliminating these corners.

Advantageous Effects of Invention

According to the brake disc of the present invention, since the plurality of weight reduction holes is formed in the slide section, it is possible to reduce the weight of the brake disc and improve the heat release property in the slide section. In addition, since the surface of the brake pad can be cleaned by opening rims of the weight reduction holes, it is possible to prevent deterioration of the braking performance caused by foreign objects adhering to a slide surface which makes sliding contact with the brake pad. Further, since the grooves are formed across the slide section, it is possible to reduce the weight of the brake disc, improve the heat release property in the slide section, and improve the cleaning effect on the surface of the brake pad also by the grooves. In addition, although, in a region between adjacent weight reduction holes that are closely arranged, the heat capacity is smaller than that in the other regions, and temperature fluctuation in such a between-holes region therefore becomes larger than that in the other regions, frictional heat which is generated by direct contact between the between-holes region and the brake pad is not generated in the present invention by virtue of the grooves formed in the between-holes region. Therefore, it is possible to suppress generation of a heat spot in the between-holes region to thereby prevent thermal shrinkage in the between-holes region. As a result, a problem of breakage of the between-holes region due to the thermal shrinkage can be effectively prevented.

DESCRIPTION OF EMBODIMENT

Figure 1:
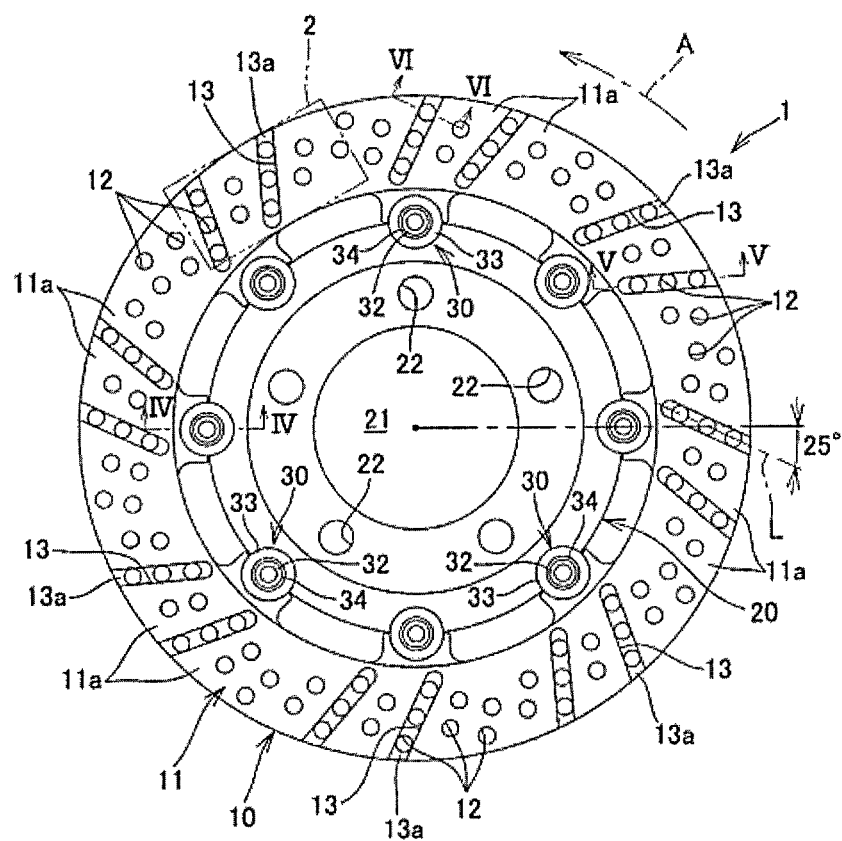
FIG. 1 is a front view of a brake disc.

Hereinafter, an embodiment of the present invention will be described with reference to the drawings.

As shown in FIGS. 1 to 6, a floating brake disc 1 is a brake disc for a two-wheeled motor vehicle. The floating brake disc 1 is provided with an annular plate-shaped slide disc 10, a hub disc 20 which is attached to the inside of the slide disc 10 with a predetermined space therebetween, and a plurality of connectors 30 which connects the slide disc 10 and the hub disc 20 to each other in a floating state. In this regard, the present invention can also be applied to a brake disc for a vehicle other than a two-wheeled motor vehicle, and also to a brake disc that is formed out of a single piece of metal plate.

The slide disc 10 is manufactured in such a manner that a flat metal plate which is made of a stainless steel or a carbon steel having an excellent heat resistant property is processed into the shape of the annular slide disc 10, after which an annular slide section 11 to which a brake pad 2 is slidingly contacted is then subjected to a heat treatment thereon. The size of the slide disc 10 can be set to 200 mm in outer diameter and 5 mm in thickness, for example.

The hub disc 20 is composed of a light metal material such as an aluminum alloy in order to reduce the weight thereof, for example. The hub disc 20 is formed into a flat circular disc shape. In a central part of the hub disc 20, there is formed a mounting hole 21 into which an end portion of a wheel hub (not shown) is inserted. Further, a plurality of bolt insertion holes 22 for mounting the hub disc 20 to the wheel hub is formed on the hub disc 20 so as to surround the mounting hole 21.

Although the slide disc 10 and the hub disc 20 are disposed in the same plane in the brake disc 1 shown in FIGS. 1 to 6, the slide disc 10 and the hub disc 20 can also be disposed in respective planes that are parallel to each other with a certain space therebetween in the thickness direction (the axial direction) of the brake disc 1 depending on the configuration of a vehicle body. Further, the thicknesses of the discs 10 and 20 may be set to the same thickness as each other and may also be set to different thicknesses from each other. In this regard, the present invention is characterized in the slide disc 10. Therefore, as for the configuration of the hub disc 20, it is possible to employ any existing configurations.

The connectors 30 are provided between the slide disc 10 and the hub disc 20 at regular intervals between the connectors 30 in the circumferential direction. In FIG. 1, the number of the connectors 30 which connect the slide disc 10 and the hub disc 20 in a floating state is eight. However, the number of the connectors 30 which connect the discs 10 and 20 in a floating state can be other than eight.

Now, the connectors 30 will be described. As shown in FIGS. 1 to 4, semicircular brake side connection concave portions 15 are formed in an inner circumference of the slide disc 10 at positions corresponding to disposing positions of the connectors 30. On the other hand, semicircular hub side connection concave portions 25 are formed in an outer circumference of the hub disc 20 so as to face the respective brake side connection concave portions 15. When the discs 10 and 20 are in a combined state, generally circular connection holes 31 are formed between the discs 10 and 20 by the connection concave portions 15 and 25. Connection pins 32 are attached to the respective connection holes 31 to thereby restrict relative rotation and relative movement in an axial direction between the discs 10 and 20. Spring members 33 each of which is composed of a disc spring and washers 34 for receiving the spring members 33 are attached to the exterior of the respective connection pins 32. The discs 10 and 20 are continuously biased by the spring members 33 so as to be both located in the same plane and supported in a floating state. Further, connectors having a configuration other than the configuration shown in the figures can also be employed as the connectors 30.

Figure 2:
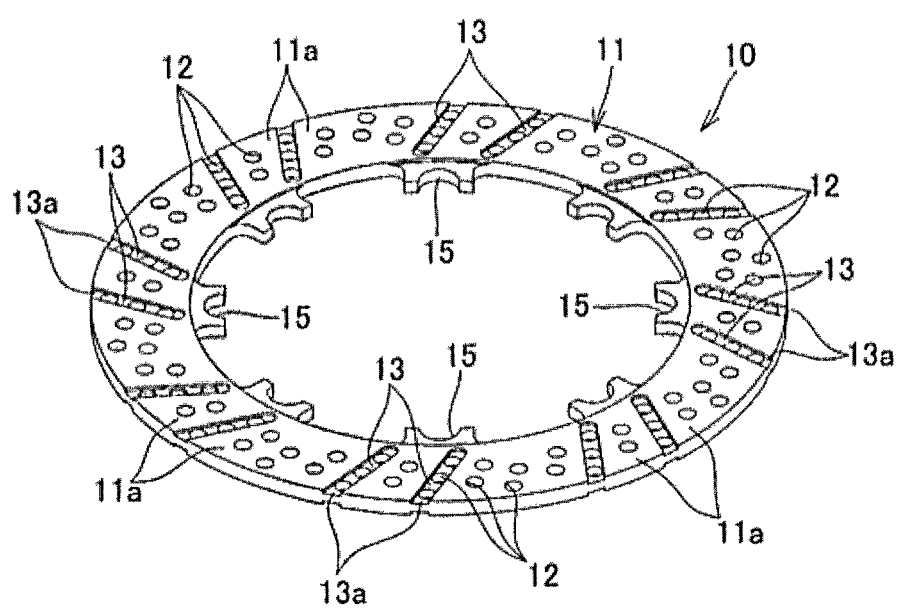
FIG. 2 is a perspective view of a slide disc.
Figure 3:
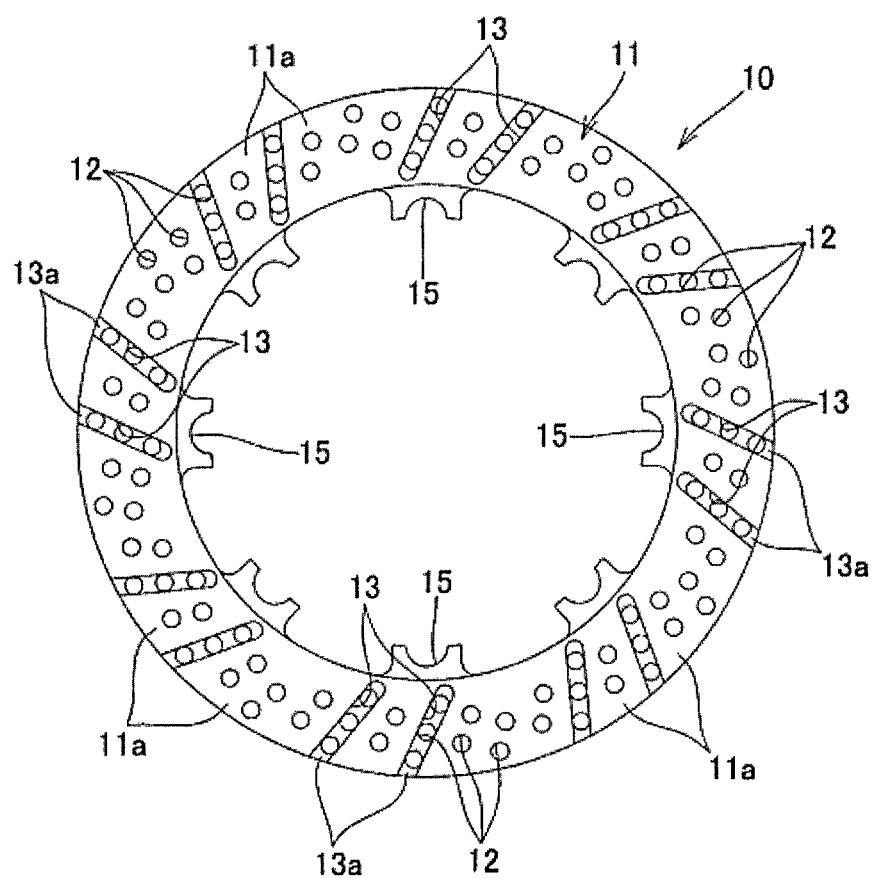
FIG. 3 is a front view of the slide disc.
Figure 4:
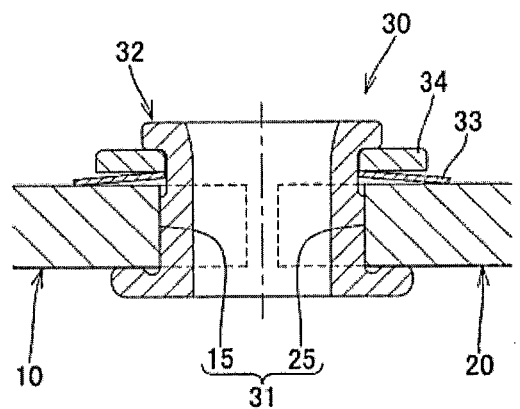
FIG. 4 is a cross sectional view taken along line IV-IV of FIG. 1.
Figure 5:
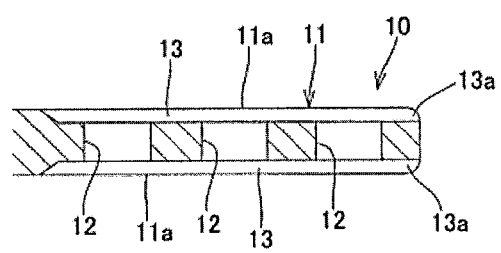
FIG. 5 is a cross sectional view taken along line V-V of FIG. 1.
Figure 6:
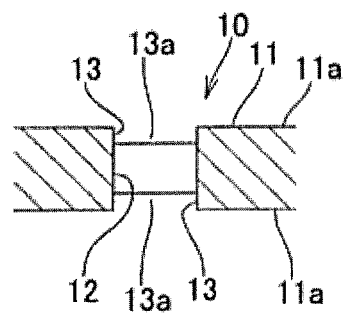
FIG. 6 is a cross sectional view taken along line VI-VI of FIG. 1.

In the slide section 11, a plurality of weight reduction holes 12 is formed in a predetermined arrangement for the purpose of improvement of the heat release property and weight reduction of the brake disc 1, and also cleaning of a slide surface 11a of the brake pad 2. The weight reduction holes 12 are preferably arranged so as to be uniformly distributed with respect to the slide section 11 so that effects of the heat release property and the weight reduction can be uniformly obtained throughout the brake disc 1. In addition, the weight reduction holes 12 are preferably arranged at intervals in the circumferential direction and also in the radial direction so that a whole area of the slide surface 11a of the brake pad 2 can be cleaned by rims of the weight reduction holes 12 by rotation of the brake pad 2 by a certain angle on a slide surface 11a of the brake disc 1 during braking. In particular, the weight reduction holes 12 may be formed at intervals in the radial direction on line segments in the radial direction, the line segments being positioned at predetermined intervals in the circumferential direction. Also, the weight reduction holes 12 may be formed at intervals in the radial direction on straight lines positioned at predetermined intervals in the circumferential direction and at an angle with respect to the radial direction. Also, the weight reduction holes 12 may be formed at intervals in the radial direction on curved lines positioned at predetermined intervals in the circumferential direction and at an angle with respect to the radial direction. For example, in the brake disc 1 shown in FIG. 1, one hundred and twelve weight reduction holes 12 in total are formed on forty-eight straight lines L which are positioned at 7.5° intervals in the circumferential direction and at an angle of 25° with respect to the radial direction. More specifically, the one hundred and twelve weight reduction holes 12 include eight groups formed in the circumferential direction, each of the eight groups including three, two, three, two, two, and two of the weight reduction holes 12, each being arranged at an interval or intervals in the radial direction on the respective straight lines L, namely, fourteen in total of the weight reduction holes 12. The diameter of each of the weight reduction holes 12 is preferably set in the range of 4 to 10 mm in order to sufficiently ensure the mechanical strength and the braking performance of the brake disc 1. In the brake disc 1 shown in FIG. 1, the diameter of each of the weight reduction holes 12 is set to 5 mm. In this regard, however, it is also possible to form, as the weight reduction holes 12, elongated slit-shaped holes other than the circular holes as shown in FIGS. 1 to 3. The shape, the size, the number, and the arrangement of the weight reduction holes 12 can be appropriately determined in view of the mechanical strength, the braking performance, the design, and the heat release property of the brake disc 1.

A plurality of grooves 13 is formed on the slide section 11 at predetermined intervals in the circumferential direction so as to pass through a plurality of adjacent ones of the weight reduction holes 12. Each of the grooves 13 is formed into a straight or curved shape so as to be formed across the slide section 11 from the inner circumference through the outer circumference thereof. More specifically, the grooves 13 are formed on the line segments in the radial direction, the line segments passing through the weight reduction holes 12 and being positioned at predetermined intervals in the circumferential direction, on the straight lines passing through the weight reduction holes 12, the straight lines being positioned at predetermined intervals in the circumferential direction and at an angle with respect to the radial direction, or on the curved lines passing through the weight reduction holes 12, the curved lines being positioned at predetermined intervals in the circumferential direction and at an angle with respect to the radial direction so as to be formed across the slide section 11. Although it is possible to form the grooves 13 so as to pass through all of the weight reduction holes 12, the contact area between the brake disc 1 and the brake pad 2 is reduced and the braking performance is therefore deteriorated in such a configuration. Therefore, among regions each between adjacent ones of the weight reduction holes 12, the grooves 13 are preferably formed so as to pass through a region in which thermal shrinkage is likely to occur and weight reduction holes 12 located on both sides of the region. That is, in a region between adjacent ones of the weight reduction holes 12 in which a distance therebetween is shorter than a distance between the other adjacent ones of the weight reduction holes 12, thermal shrinkage is likely to occur. Therefore, it is preferred to form the grooves 13 so as to pass through such a between-holes region and weight reduction holes 12 that are formed on both sides thereof to thereby suppress temperature rise caused by direct contact between the between-holes region and the brake pad 2 so that the thermal shrinkage is prevented. For example, as shown in FIG. 1, the grooves 13 are formed only in regions in each of which three of the weight reduction holes 12 are continuously formed on the straight line L that is positioned at an angle of 25° with respect to the radial direction so as to pass through these three weigh reduction holes 12. Accordingly, in this case, the number of the grooves 13 formed on one of surfaces of the slide section 11 is sixteen, namely, the number of the grooves 13 formed on both of the surfaces of the slide section 11 is thirty-two in total.

Further, although it is preferred that the grooves 13 are formed on both of the surfaces of the slide section 11 in order to uniformly set the braking performance in both of the surfaces of the slide section 11, the grooves 13 can also be formed on only one of the surfaces of the slide section 11. When the grooves 13 are formed on both of the surfaces of the slide section 11, it is preferred that positions of the grooves 13 formed on one of the surfaces of the slide section 11 correspond to positions of the respective grooves 13 formed on the other surface. However, positions of the grooves 13 formed on one of the surfaces of the slide section 11 can be different from positions of the respective grooves 13 formed on the other surface. Further, although it is preferred that the same number of the grooves 13 are formed on each of the surfaces of the slide section 11, the different number of the grooves 13 can also be formed on each of the surfaces. For example, in FIG. 1, one of two grooves 13 in each of eight pairs, each of the eight pairs being composed of two adjacently arranged grooves 13, may be formed in one of the surfaces of the slide section 11 and the other groove 13 is formed on the other surface of the slide section 11, so that eight grooves 13 are formed on each of the surfaces of the slide section 11.

Openings 13a each of which opens outward are formed on respective end portions of the respective grooves 13 at an outer circumferential side of the slide section 11. Foreign objects which have entered the grooves 13 are moved toward the end portions of the grooves 13 at the outer circumferential side by centrifugal force caused by rotation of the brake disc 1 and then discharged to the outside from the openings 13a. Further, when each of the grooves 13 is formed into a linear shape or a curved shape at an angle with respect to the radial direction, it is preferred that the grooves 13 are formed to be inclined with respect to the radial direction so that one end portion of each of the grooves 13 at an inner circumferential side of the slide section 11 is positioned forward of the other end portion thereof at the outer circumferential side of the slide section 11 in a rotation direction of the brake disc 1 (a direction indicated by arrow A in FIG. 1) as shown in FIG. 1. With such a configuration, foreign objects which have entered the grooves 13 are guided toward the outer circumference of the brake disc 1 by contact with the brake pad 2 during braking, thereby making it possible to further efficiently discharge the foreign objects to the outside.

The shape of a cross section of each of the grooves 13, the cross section being perpendicular to the length direction thereof, can be set to any shape. However, it is preferred that each of the grooves 13 is formed into a quadrangular groove having a rectangular or square cross section and an inner surface thereof is formed in the thickness direction of the slide section 11. This is because of that, with such a configuration, even if the brake disc 1 becomes worn, the widths of the openings of the grooves 13 remain unchanged, thereby making it possible to prevent a subtle change in the operational feeling of a brake, the subtle change being caused by wear of the slide section 11, to thereby obtain a stable operational feeling.

The depth of each of the grooves 13 can be set to any depth that is capable of ensuring mechanical strength required for the brake disc 1. A ratio of the depth of each of the grooves 13 with respect to the thickness of the slide section 11 is set equal to or less than 70%, and preferably in the range of 5% to 60%. When the grooves 13 are formed at corresponding positions on both of the surfaces of the slide section 11, the sum of the depths of two corresponding grooves 13 formed on respective front and back surfaces of the slide section 11 is set equal to or less than 70%, and preferably in the range of 5% to 60% of the thickness of the slide section 11. On the other hand, when the grooves 13 are formed at different positions on both of the surfaces of the slide section 11, the depth of a single groove 13 is set equal to or less than 70%, and preferably in the range of 5% to 60% of the thickness of the slide section 11. In the brake disc 1 shown in FIG. 1, the depth of each of the grooves 13 is set to 10% of the thickness of the slide section 11 (0.5 mm).

The width of each of the grooves 13 can be set to a size that is smaller than the diameters of the weight reduction holes 12. However, in such a configuration, corners facing the weight reduction holes 12 are formed in intersecting portions between the grooves 13 and the weight reduction holes 12, and these corners are easily to be broken. Therefore, it is preferred that the width of each of the grooves 13 is set to a size that is equal to or larger than the diameters of the weight reduction holes 12 so that the grooves 13 contain the weight reduction holes 12 therein. Further, as the grooves 13, it is also possible to form grooves 13 having different widths or different depths in a mixed manner. Furthermore, it is also possible to form grooves 13 in each of which the width or the depth is changed in a midway part in the length direction thereof.

Next, an evaluation test of a brake disc in which grooves are formed will be described.

Figure 7:
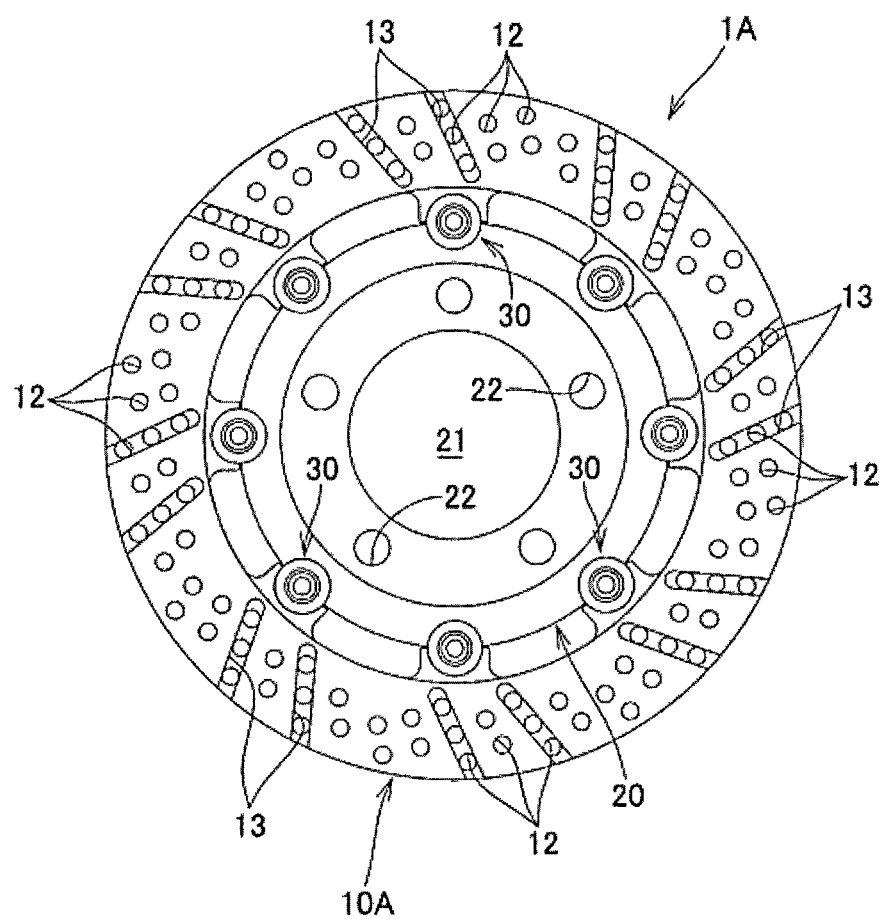
FIG. 7 is a front view of a brake disc of Example 2.
Figure 8:
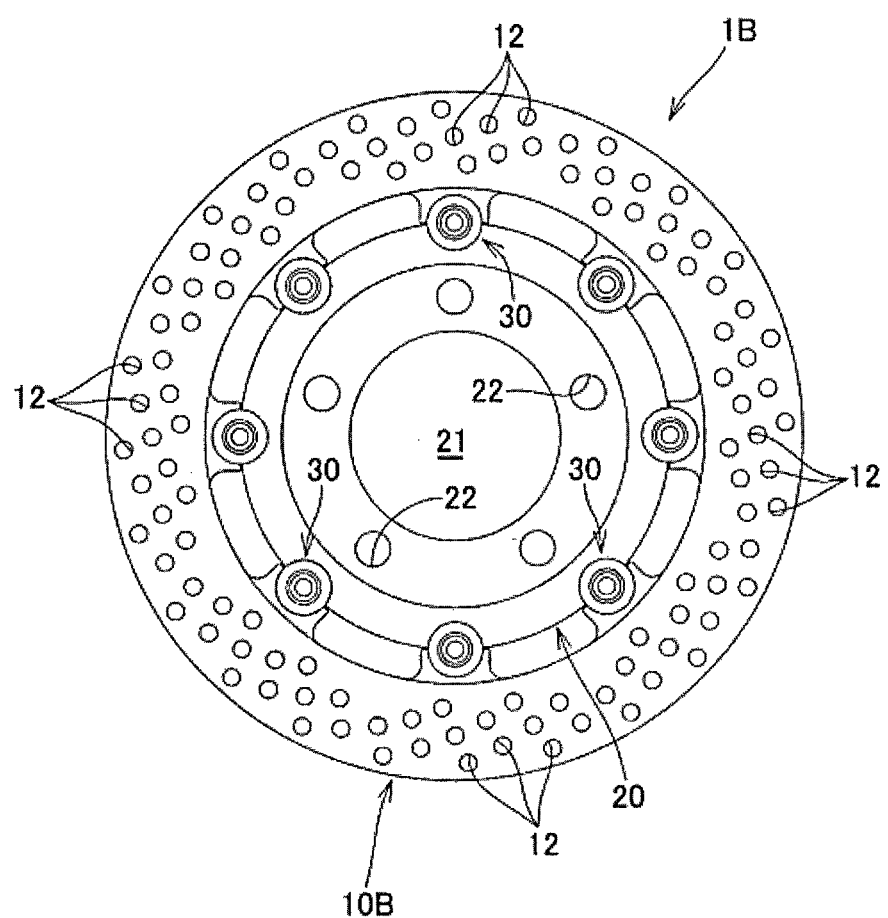
FIG. 8 is a front view of a brake disc of Comparative Example.

As Example 1, there was manufactured a brake disc 1 using a slide disc 10 which is made of a stainless steel plate having a thickness of 5 mm and a diameter of 200 mm and has a slide section 11 on which one hundred and twelve weight reduction holes 12 each of which is composed of a circular hole having a diameter of 5 mm are formed by the arrangement shown in FIG. 1. In addition, in the slide disc 10, among forty-eight straight lines L arranged at predetermined intervals in the circumferential direction and at an angle of 25° with respect to the radial direction so as to pass through the weight reduction holes 12, grooves 13 each having a width of 5 mm are formed on respective sixteen straight lines L each arranged so as to pass through three of the weight reduction holes 12, the grooves 13 being formed on both of surfaces of the slide section 11. Further, as Example 2, there was manufactured a brake disc 1A using a slide disc 10A which has the same configuration as the configuration of the slide disc 10 in Example 1 except that grooves 13 are formed so as to be inclined in a direction opposite to the inclined direction of the grooves 13 in Example 1, as shown in FIG. 7. Further, as Comparative Example, there was manufactured a brake disc 1B using a slide disc 10B which has the same configuration as the configuration of the slide disc 10 in Example 1 except that the grooves 13 are omitted, as shown in FIG. 8.

(Efficacy Test)

Figure 9:
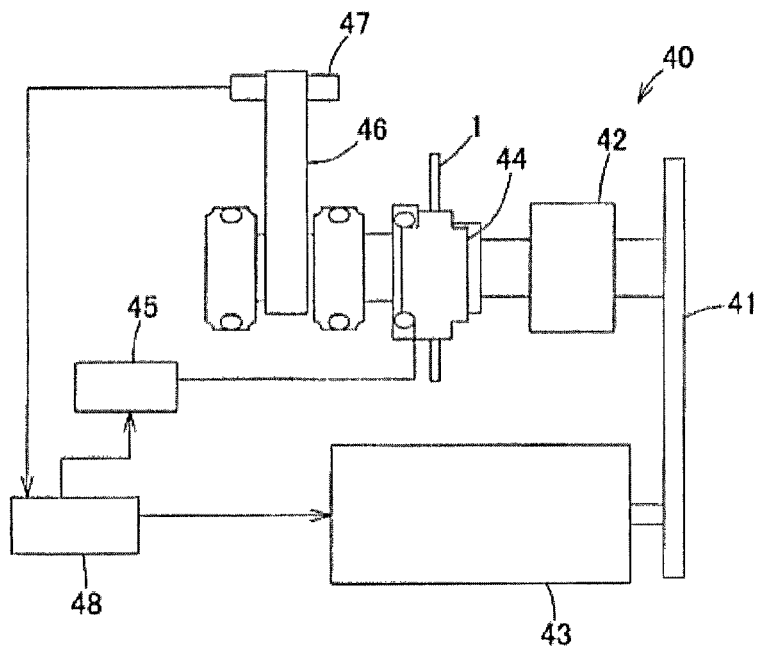
FIG. 9 is a schematic illustration of a bench testing device.

A bench testing device 40 as shown in FIG. 9 was used as a testing device. The bench testing device 40 is provided with an alternating-current (AC) motor 43 which rotationally drives the brake disc 1 through a belt 41 and an inertia 42, an inverter (not shown) which controls the rotation speed of the AC motor 43, a caliper 44 for applying a braking force to the test disc 1, a master cylinder 45 which supplies a braking hydraulic pressure to the caliper 44, a load cell 47 which measures braking torque generated during braking through an arm 46 which is coaxially disposed with the caliper 44, and a controller 48 which controls the AC motor 43 and the master cylinder 45. Further, the bench testing device 40 is configured so that the AC motor 43 is controlled by the inverter to thereby control the rotation speed of the brake disc 1, the braking hydraulic pressure supplied to the caliper 44 is controlled by the master cylinder 45 so that the brake disc 1 is held by the brake pad 2 which is composed of a pair of sintered pads of the caliper 44, and braking torque at this time is measured by the load cell 47.

First, each of the brake disc 1 of Example 1, the brake disc 1A of Example 2, and the brake disc 1B of Comparative Example was set in the bench testing device 40. Then, bedding was carried out ten times under the test conditions shown in Table 1. After that, two kinds of main tests in each of which the temperature of the brake pad at the time of starting braking is set to 100° C. and 200° C. are carried out three times for each of the brake discs 1, 1A, and 1B. Further, the thickness of the brake pad was measured before and after each of the tests to thereby measure the wear amount of the brake pad. As a result, results shown in Table 2 and FIG. 10 were obtained. Further, the coefficient of friction in a brake section was calculated in each of the tests using the following formula. As a result, results shown in Table 2 and FIG. 11 were obtained.

$$\text{Coefficient of friction} = (T/P) \times (1/(R \times S)) \times (1/2) \times (1/100)$$

T: Torque obtained from product of length of arm 46 and measured value by load cell 47 (Nm)
P: Hydraulic pressure supplied to caliper 44 (MPa)
R: Effective radius of brake (m)
S: Area of cylinder obtained from piston diameter of caliper 44 (cm$^2$)

TABLE 1

|  | Initial velocity (km/h) | Terminal velocity (km/h) | Inertia (kgm$^2$) | Pad temperature when starting braking (° C.) | Deceleration (m/s$^2$) | Hydraulic pressure (Mpa) | Wind velocity (m/s) | Number of times | Set |
|---|---|---|---|---|---|---|---|---|---|
| Bedding | 50 | 0 | 12.25 | 80 | 3 | — | 11 | 10 | — |
| Main test | 50 | 0 | 12.25 | 100 | — | 0.5 to 2.0 (Step: 0.5) | 11 | 1 for each | 3 |
| Main test | 50 | 0 | 12.25 | 200 | — | 0.5 to 2.0 (Step: 0.5) | 11 | 1 for each | 3 |

TABLE 2

Unit: mm

|  | Pad wear amount | Coefficient of friction (average value: n = 3) | | | | | | | |
|---|---|---|---|---|---|---|---|---|---|
|  |  | Start braking at pad temperature of 100° C. | | | | Start braking at pad temperature of 200° C. | | | |
|  |  | 0.5 MPa | 1.0 MPa | 1.5 MPa | 2.0 MPa | 0.5 MPa | 1.0 MPa | 1.5 MPa | 2.0 MPa |
| Example 1 | 0.36 | 0.68 | 0.64 | 0.64 | 0.64 | 0.62 | 0.61 | 0.62 | 0.64 |
| Example 2 (oppositely inclined grooves) | 0.29 | 0.64 | 0.62 | 0.62 | 0.63 | 0.58 | 0.58 | 0.60 | 0.62 |
| Comparative example (without groove) | 0.54 | 0.63 | 0.60 | 0.59 | 0.58 | 0.59 | 0.57 | 0.59 | 0.59 |

Figure 10:
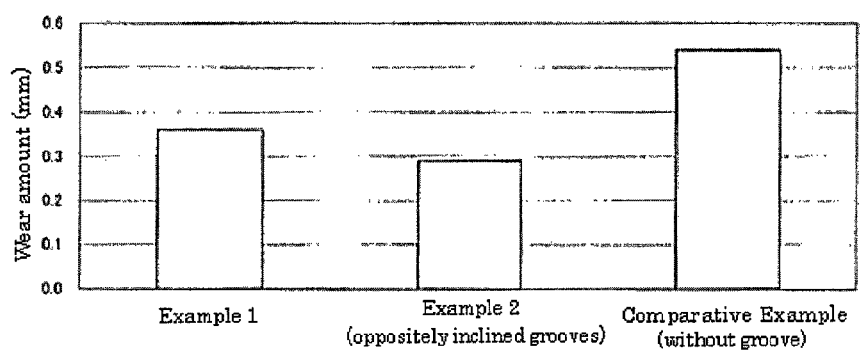
FIG. 10 is a graph of wear amount.
Figure 11:
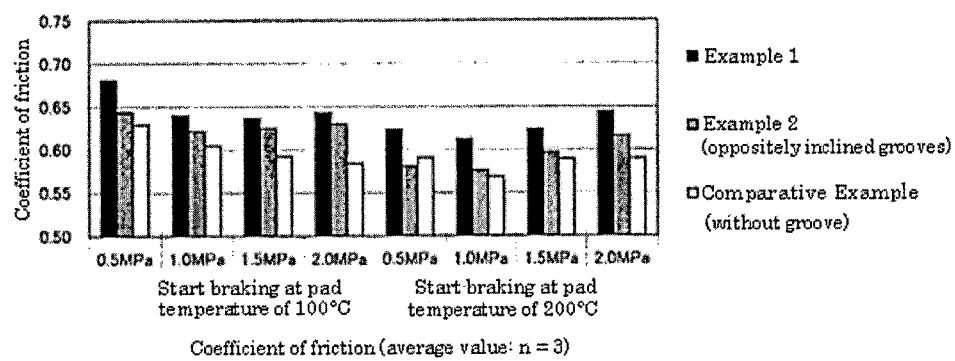
FIG. 11 is a graph of coefficient of friction.

Table 2 and FIG. 10 show that, in Example 1 and Example 2 in each of which the grooves 13 are formed, the wear amount of the brake pad is smaller than that in Comparative Example in which the grooves 13 are not formed, and the service life of the brake pad can therefore be extended. Further, Table 2 and FIG. 11 show that, in Example 1 and Example 2 in each of which the grooves 13 are formed, the coefficient of friction is larger than that in Comparative Example in which the grooves 13 are not formed, and the braking performance is therefore higher than that in Comparative Example. Furthermore, it is also understood that, although the wear amount of the brake pad in Example 1 is larger than that in Example 2, Example 1 is more preferable than Example 2 because the braking performance is made higher due to a high coefficient of friction.

(Thermal Shrinkage Observation Test)

First, each of the brake disc 1 of Example 1, the brake disc 1A of Example 2, and the brake disc 1B of Comparative Example was set in the bench testing device 40. Then, while measuring the temperature of the slide disc 10, a braking state in which a braking force operates at a deceleration of 0.2 G and a cooling state in which a braking force does not operates were repeated so that the temperature of the slide disc 10 is converged to a preset temperature that is equal to or lower than the heat resistant temperature of a material of the slide disc 10, for example, to a preset temperature of 600° C.±20° C. in a case where the slide disc 10 is made of a stainless steel "JFE410DBSR*AN-U (heat resistant temperature: 650° C.)" manufactured by JFE Steel Corporation. The braking state and the cooling state were repeated until when a maximum temperature of the slide disc 10 became maintained substantially constant within the preset temperature even when the braking state and the cooling state were repeated ten times, for example. Then, the brake disc was removed from the bench testing device 40 and occurrence of thermal shrinkage in the slide disc 10 was visually observed.

As a result of this, thermal shrinkage occurred between the weight reduction holes 12 in Comparative Example in which the grooves 13 are not formed and, on the other hand, thermal shrinkage did not occur in Examples 1 and 2 in each of which the grooves 13 are formed. Therefore, it turned out that thermal shrinkage in the weight reduction holes 12 can be prevented by forming the grooves 13.

REFERENCE SIGNS LIST

1 Brake disc
2 Brake pad
10 Slide disc
11 Slide section
11a Slide surface
12 Weight reduction hole
13 Groove
13a Opening
15 Brake side connection concave portion
20 Hub disc
21 Mounting hole
22 Bolt insertion hole
25 Hub side connection concave portion
30 Connector
31 Connection hole
32 Connection pin
33 Spring member 34 Washer
40 Bench testing device
41 Belt
42 Inertia
43 Alternating-current (AC) motor
44 Caliper
45 Master cylinder
46 Arm
47 Load cell
48 Controller
1A Brake disc
10A Slide disc
1B Brake disc
10B Slide disc

The invention claimed is:

1. A brake disc for a two-wheeled motor vehicle, the brake disc comprising a plurality of weight reduction holes for weight reduction, the weight reduction holes being formed in a slide section making sliding contact with a brake pad,
wherein a plurality of grooves is formed at predetermined intervals in a circumferential direction so as to pass through a plurality of adjacent ones of the weight reduction holes, the grooves being formed on at least one of slide surfaces of the slide section, and
wherein, among regions each between adjacent ones of the weight reduction holes, the grooves are formed so as to pass through a region between adjacent ones of the weight reduction holes in which a distance therebetween is shorter than a distance between other adjacent ones of the weight reduction holes and weight reduction holes arranged on both sides of the region.

2. The brake disc according to claim 1, wherein each of the grooves is formed into a linear shape or a curved shape from an inner circumference through an outer circumference of the slide section.

3. The brake disc according to claim 1, wherein the grooves are formed to be inclined at an angle in a single direction with respect to a radial direction of the slide section.

4. The brake disc according to claim 1, wherein the grooves are formed to be inclined so that one end portion of each of the grooves at an inner circumferential side of the slide section is positioned forward of the other end portion thereof at an outer circumferential side of the slide section in a rotation direction of the brake disc.

5. The brake disc according to claim 1, wherein at least the end portion of each of the grooves at an outer circumferential side of the slide section opens.

6. The brake disc according to claim 1, wherein each of the grooves is formed into a quadrangular groove.

7. The brake disc according to claim 1, wherein the width of each of the grooves is set to a size equal to or larger than the diameters of the weight reduction holes so that the grooves contain the weight reduction holes therein.

* * * * *